US012678941B2

(12) United States Patent
Takeda

(10) Patent No.: US 12,678,941 B2
(45) Date of Patent: Jul. 14, 2026

(54) SIMULATION DEVICE

(71) Applicant: FANUC CORPORATION, Yamanashi (JP)

(72) Inventor: Toshiya Takeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 171 days.

(21) Appl. No.: 18/683,246

(22) PCT Filed: Sep. 8, 2021

(86) PCT No.: PCT/JP2021/033044
§ 371 (c)(1),
(2) Date: Feb. 13, 2024

(87) PCT Pub. No.: WO2023/037456
PCT Pub. Date: Mar. 16, 2023

(65) Prior Publication Data
US 2025/0135635 A1 May 1, 2025

(51) Int. Cl.
*B25J 9/16* (2006.01)

(52) U.S. Cl.
CPC ........... *B25J 9/1605* (2013.01); *B25J 9/1674* (2013.01)

(58) Field of Classification Search
CPC ...... B25J 9/1605; B25J 9/1674; B25J 9/1671; B25J 19/06; B25J 9/1666; B25J 9/1676; G05D 1/617; G05D 1/0214
See application file for complete search history.

(56) References Cited

U.S. PATENT DOCUMENTS

| | | | |
|---|---|---|---|
| 2005/0055134 A1* | 3/2005 | Okuda ............... | G05B 19/4061 |
| | | | 318/568.12 |
| 2009/0091286 A1* | 4/2009 | Nihei ..................... | B25J 9/1666 |
| | | | 318/568.13 |
| 2012/0022689 A1 | 1/2012 | Kapoor | |
| 2017/0232614 A1* | 8/2017 | Takeda ................... | B25J 9/1676 |
| | | | 703/7 |

FOREIGN PATENT DOCUMENTS

| | | | |
|---|---|---|---|
| JP | 2005-081445 A | | 3/2005 |
| JP | 2009-090403 A | | 4/2009 |
| JP | 2010224765 A | * | 10/2010 |
| JP | 2011-212831 A | | 10/2011 |
| JP | 2017-144514 A | | 8/2017 |
| JP | 2018-008347 A | | 1/2018 |
| WO | 2009072383 A1 | | 6/2009 |
| WO | 2011080882 A1 | | 7/2011 |

* cited by examiner

*Primary Examiner* — Bao Long T Nguyen
(74) *Attorney, Agent, or Firm* — HAUPTMAN HAM, LLP

(57) ABSTRACT

A simulation device provided with: a region setting unit that sets an operation allowing region for a robot; an inference unit that infers the operation of the robot after stopping control is performed on the robot in response to the robot operating outside of the operation allowing region; and a visualization unit that on the basis of the inferred operation of the robot, allows the portion of the robot outside of the operation allowing region to be visualized.

13 Claims, 13 Drawing Sheets

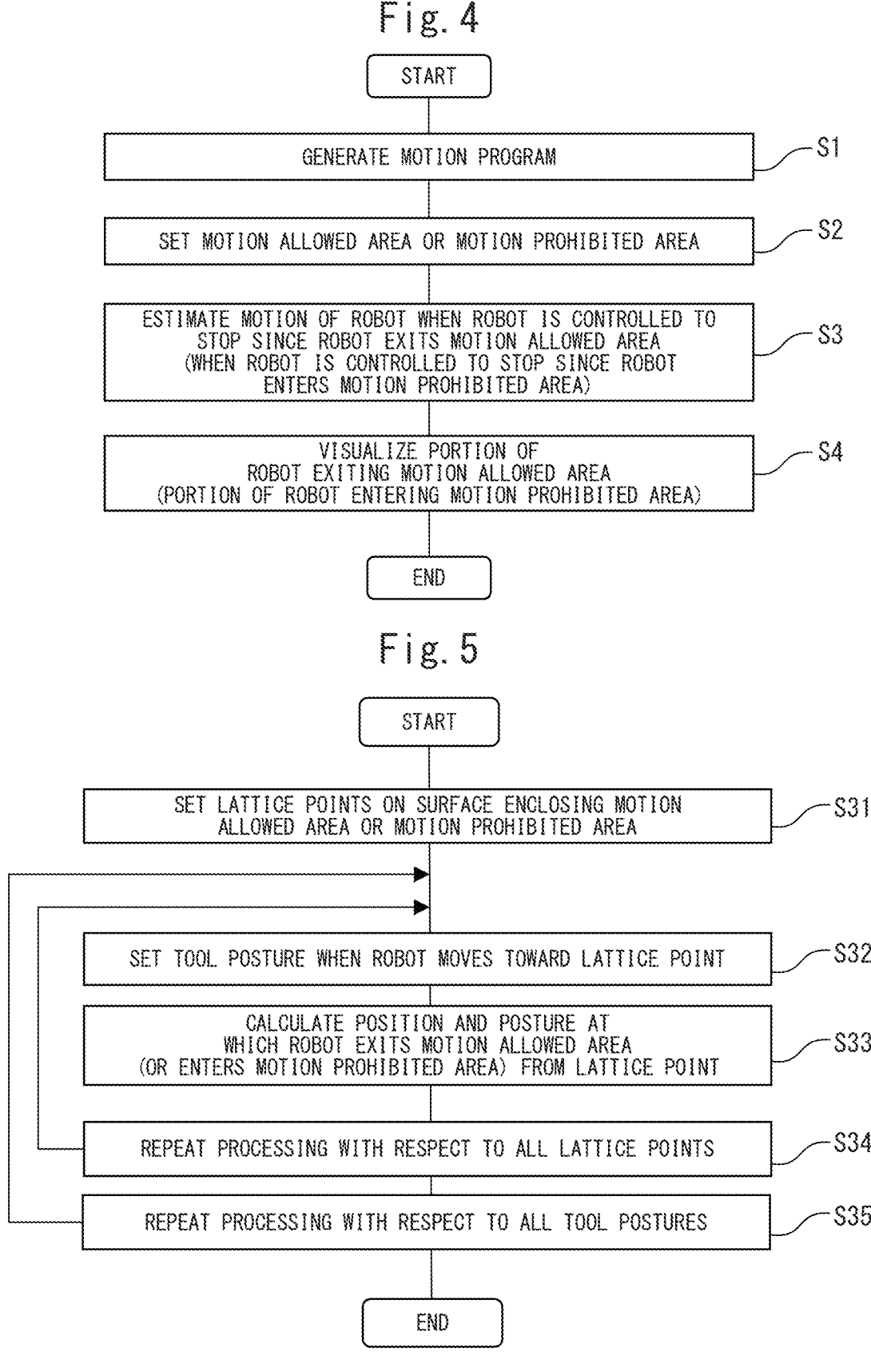

Fig. 4

START

GENERATE MOTION PROGRAM — S1

SET MOTION ALLOWED AREA OR MOTION PROHIBITED AREA — S2

ESTIMATE MOTION OF ROBOT WHEN ROBOT IS CONTROLLED TO STOP SINCE ROBOT EXITS MOTION ALLOWED AREA (WHEN ROBOT IS CONTROLLED TO STOP SINCE ROBOT ENTERS MOTION PROHIBITED AREA) — S3

VISUALIZE PORTION OF ROBOT EXITING MOTION ALLOWED AREA (PORTION OF ROBOT ENTERING MOTION PROHIBITED AREA) — S4

END

Fig. 5

START

SET LATTICE POINTS ON SURFACE ENCLOSING MOTION ALLOWED AREA OR MOTION PROHIBITED AREA — S31

SET TOOL POSTURE WHEN ROBOT MOVES TOWARD LATTICE POINT — S32

CALCULATE POSITION AND POSTURE AT WHICH ROBOT EXITS MOTION ALLOWED AREA (OR ENTERS MOTION PROHIBITED AREA) FROM LATTICE POINT — S33

REPEAT PROCESSING WITH RESPECT TO ALL LATTICE POINTS — S34

REPEAT PROCESSING WITH RESPECT TO ALL TOOL POSTURES — S35

END

AMOUNT OF CHANGE OF DRIVE AXIS WHEN EMERGENCY STOP IS PERFORMED

| | | WEIGHT OF WORK TOOL | | | | |
|---|---|---|---|---|---|---|
| | | 10kg | 20kg | 30kg | 40kg | 50kg |
| MOTION SPEED OF DRIVE AXIS | 10deg/s | 5deg | 6deg | 7deg | 8deg | 9deg |
| | 20deg/s | 6deg | 7deg | 8deg | 9deg | 10deg |
| | 30deg/s | 7deg | 8deg | 9deg | 10deg | 11deg |
| | 40deg/s | 8deg | 9deg | 10deg | 11deg | 12deg |
| | 50deg/s | 9deg | 10deg | 11deg | 12deg | 13deg |

SIMULATION DEVICE

RELATED APPLICATIONS

The present application is a National Phase of International Application No. PCT/JP2021/033044 filed Sep. 8, 2021.

FIELD

The present invention relates to a simulation device.

BACKGROUND

In general, in a robot system, lest the robot interfere with a nearby device or the like, measures in which by setting a motion allowed area for the robot, the robot is controlled in such a manner as not to come out of the motion allowed area and a safety guard fence is arranged outside the motion allowed area are taken. With regard to generation of a motion range of a robot, PTL 1 describes "a robot control device including a setting means for setting a motion range for each axis of a robot and a work tool, a storage means for storing coasting distance of the robot that is determined according to at least one of motion speed of the robot and weight of the work tool, and a reachable range calculation means for calculating a reachable range that the robot is able to reach, based on the motion range set by the setting means and the coasting distance stored in the storage means" (Abstract).

PTL 2 describes "a robot movement regulating method that is performed by defining an arm occupying area of an arm including an arm of a robot and a workpiece and tool mounted on a wrist of the arm and a movement prohibited area that the arm is not allowed to enter in a memory, estimating a coasting angle of each axis of the robot when the robot is emergently stopped while a command to move to the next target position is executed, calculating a predicted coasting position of the robot by adding the coasting angle of each axis of the robot to the next target position, confirming whether or not the arm occupying area at the predicted coasting position enters the movement prohibited area, and when the entrance is confirmed, performing control to immediately stop the movement of the robot" (Abstract).

CITATION LIST

Patent Literature

[PTL 1] Japanese Unexamined Patent Publication (Kokai) No. 2009-090403 A
[PTL 2] PCT International Publication No. WO 2009/072383 A1

SUMMARY

Technical Problem

In general, in determining whether or not a robot has exited a motion allowed area, the robot and a tool are virtually enclosed by simple shape models, such as a sphere model, a cylinder model, and a rectangular parallelepiped model, and determination of whether or not the shape models has exited the motion allowed area is performed in a simulated manner. With regard to emergency stop applied to the robot when the robot has exited or is expected to exit the motion allowed area, there are two cases: a case where an emergency stop is applied to the robot at the moment when the robot has exited the motion allowed area; and a case where, lest the robot exit the motion allowed area, an emergency stop is applied to the robot before the robot reaches a boundary of the motion allowed area by estimating a coasting distance based on a current motion position and motion speed of the robot.

When an emergency stop is applied to the robot at the moment the robot has exited the motion allowed area, the robot stops at a position at which it projects out of the motion allowed area, since the robot coasts after the emergency stop is applied until the robot actually comes to a stop. Although therefore, it is required to enclose an area that is larger to some extent than the motion allowed area by a fence, there are some cases where an unnecessarily large area is enclosed by a fence, since it is generally difficult to grasp how large margin is required for the enclosure by a fence.

Solution to Problem

One aspect of the present disclosure is a simulation device including an area setting unit configured to set a motion allowed area for a robot, an estimation unit configured to estimate a motion of the robot when control to cause the robot to stop is applied to the robot caused by deviation of the robot from the motion allowed area, and a visualization unit configured to visualize a portion of the robot that has exited the motion allowed area, based on an estimated motion of the robot.

Another aspect of the present disclosure is a simulation device including an area setting unit configured to set a motion prohibited area for a robot, an estimation unit configured to estimate a motion of the robot when control to cause the robot to stop is applied to the robot caused by entry by the robot into the motion prohibited area, and a visualization unit configured to visualize a portion of the robot that has entered the motion prohibited area, based on an estimated motion of the robot.

Advantageous Effects of Invention

According to the above-described configuration, it becomes possible to visualize a portion of the robot that has exited the motion allowed area or a portion of the robot that has entered the motion prohibited area and install a fence at an appropriate position.

The object, characteristics, and advantages of the present invention as well as other objects, characteristics, and advantages will be further clarified from the detailed description of typical embodiments of the present invention illustrated in the accompanying drawings.

BRIEF DESCRIPTION OF DRAWINGS

FIG. 4 is a basic flowchart illustrating processing to visualize a portion of the robot that has exited a motion allowed area (a portion of the robot that has entered a motion prohibited area), the processing being executed in the simulation device.

FIG. 5 is a flowchart illustrating a specific example of estimation processing in step S3 in the basic flowchart.

DESCRIPTION OF EMBODIMENTS

Figure 1:
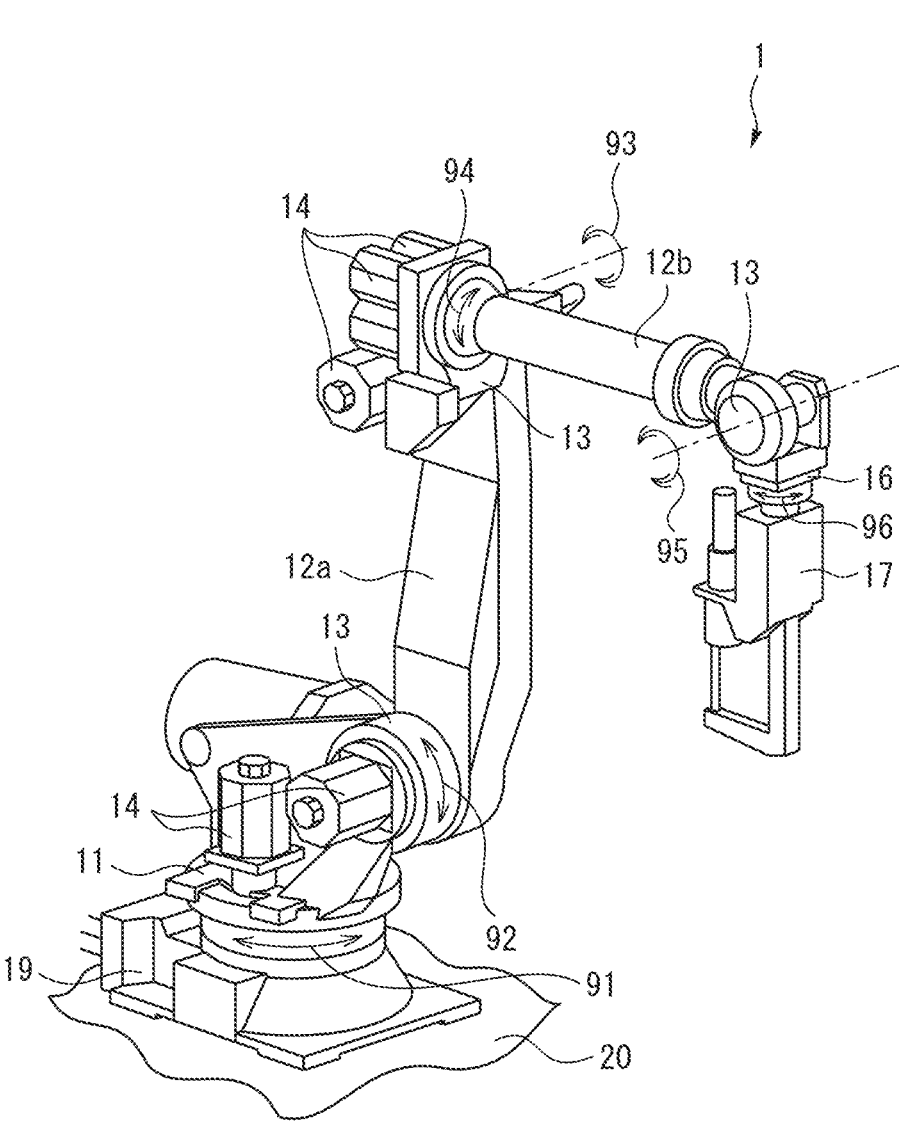
FIG. 1 is a perspective view of a robot 1 that serves as a target of simulation performed by a simulation device according to one embodiment.

An embodiment of the present disclosure will be described below with reference to the accompanying drawings. In the drawings that are referred to, the same constituents' components or functional components are given the same reference signs. To facilitate understanding, scales are appropriately changed in the drawings. In addition, the modes illustrated in the drawings are only an example for embodying the present invention, and the present invention is not limited to the illustrated modes.

A simulation device 50 according to one embodiment (see FIGS. 2 and 3) will be described below. The simulation device 50 according to the present embodiment performs motion simulation of a robot and thereby visualizes a portion of the robot that has exited a motion allowed area when the robot exits the motion allowed area and is controlled to stop or a portion of the robot that has entered a motion prohibited area when the robot enters the motion prohibited area and is controlled to stop.

FIG. 1 is a perspective view exemplarily illustrating a robot 1 that is a target of simulation performed by the simulation device 50. The robot 1 is an articulated robot including arms 12a and 12b, a wrist unit 16, and a plurality of joint units 13. To the wrist unit 16 of the robot 1, a work tool 17 serving as an end effector is attached. The robot 1 includes a drive device that drives a constituent member in each of the joint units 13. The drive device includes a motor 14 that drives a constituent member in the joint unit 13. By driving the motor 14 in each of the joint units 13 based on a position command, each of the arms 12a and 12b and the wrist unit 16 can be brought into a desired position and posture. The robot 1 also includes a base unit 19 that is fixed to a mounting surface 20 and a turning unit 11 that rotates with respect to the base unit 19. In the present example, the robot 1 is assumed to be a six-axis robot and rotational directions of an axis J1, an axis J2, an axis J3, an axis J4, an axis J5, and an axis J6 are indicated by arrows 91, 92, 93, 94, 95, and 96, respectively, in FIG. 1.

Although the work tool 17 attached to the wrist unit 16 of the robot 1 is a welding gun to perform spot welding, without being limited thereto, various tools can be attached as the work tool 17 according to work details.

In general, in many cases, when deviation of a robot from a motion allowed area or interference of the robot with a motion prohibited area is to be detected by calculation processing, an arm unit, a joint unit, a work tool, and the like of the robot are virtually enclosed by simplified shape models, such as a cylinder model, a sphere model, and a rectangular parallelepiped model, and whether or not the shapes exit the motion allowed area or interfere with the motion prohibited area is determined, from viewpoints of load reduction in the calculation processing and securing a margin. Although in the present embodiment, it is also assumed that the arm units (the arms 12a and 12b) of the robot 1, the joint units 13, and the work tool 17 are enclosed by shapes, such as a cylinder, a sphere, and a rectangular parallelepiped, and deviation of the shapes from the motion allowed area or interference of the shapes with the motion prohibited area is calculated, deviation from the motion allowed area or interference with the motion prohibited area may be calculated using a model representing shapes of the robot's own body and the work tool's own body. Note that there is a case where a reference sign 1M is given to a shape enclosing the robot 1 and the shape is referred to as a robot 1M (see, for example, FIG. 6).

Figures 2, 3:
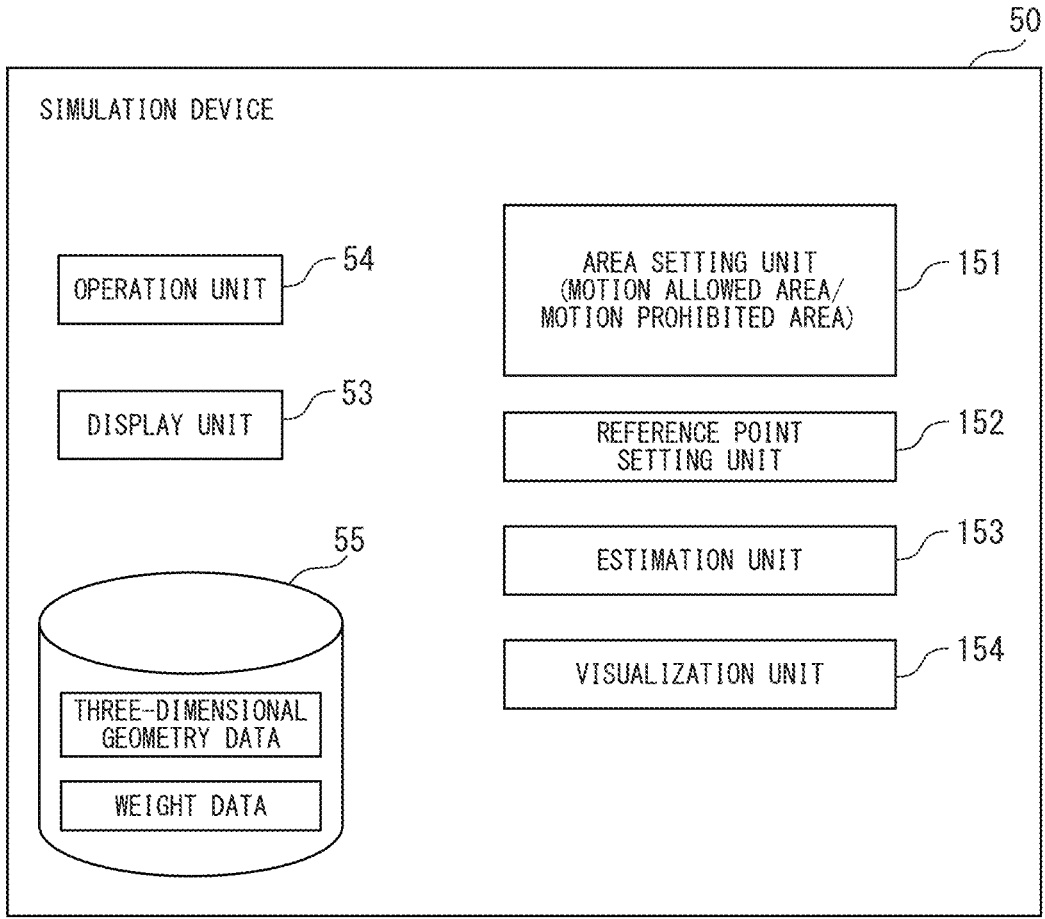
FIG. 2 is a diagram illustrating a hardware configuration example of the simulation device.
FIG. 3 is a functional block diagram of the simulation device.

In FIG. 2, a hardware configuration example of the simulation device 50 is illustrated. As illustrated in FIG. 2, the simulation device 50 may have a configuration as a general computer in which a memory 52 (a ROM, a RAM, a non-volatile memory, and the like), a display unit 53, an operation unit 54 that is formed by an input device, such as a keyboard (or software keys), a storage device 55 (an HDD or the like), an input/output interface 56, and the like are connected to a processor 51 via a bus. As the simulation device 50, various types of information processing device, such as a personal computer, a laptop computer, a tablet computer, and the like, can be used.

FIG. 3 is a functional block diagram of the simulation device 50. As illustrated in FIG. 3, the simulation device 50 includes an area setting unit 151, a reference point setting unit 152, an estimation unit 153, and a visualization unit 154. Note that in FIG. 3, the display unit 53, the operation unit 54, and the storage device 55 serving as hardware constituent elements are also illustrated.

The area setting unit 151 provides a function of setting a motion allowed area or a motion prohibited area. For example, the area setting unit 151 accepts an operation for setting or selection of a motion allowed area or a motion prohibited area by user operation. For example, the area setting unit 151 accepts an operation to set one or a plurality of areas (such as an area enclosed by flat surfaces of a rectangular parallelepiped, a polygonal column, or the like and an area enclosed by a curved surface like a sphere) as a motion allowed area or a motion prohibited area in a work space. A user may set a desired motion allowed area or motion prohibited area by specifying the number, sizes, and the like of motion allowed areas or motion prohibited areas in consideration of various types of objects arranged in the work space, such as a nearby device. Alternatively, the area setting unit may be configured to accept a user operation to select a motion allowed area from a plurality of types of motion allowed areas (for example, a motion allowed area when a door of a machine tool is closed and a motion allowed area when the door of the machine tool is open) that are prepared in advance.

The reference point setting unit 152 sets a position that is used as a reference in a calculation when a motion in which the robot 1 exits the motion allowed area (or a motion in which the robot 1 enters the motion prohibited area) is simulated. A reference point can be used as a target position, a via position, a motion start position, or the like when the robot 1 (control point) is caused to move in a simulative manner. For example, reference points may be set as a set of points distributed on an outer surface (a boundary surface) of the motion allowed area or the motion prohibited area. When the motion allowed area (motion prohibited area) is set to a rectangular parallelepiped, the reference points may be set as lattice points on each plane. The reference point setting unit 152 may, for example, accept a user operation to set a distance between lattice-shaped reference points and thereby set reference points. Alternatively, the reference point setting unit 152 may automatically set reference points.

The estimation unit 153 estimates a motion when the robot 1 is controlled to stop since the robot 1 exits the motion allowed area or a motion when the robot 1 is controlled to stop since the robot 1 enters the motion prohibited area. For example, the estimation unit 153 calculates a portion of the robot 1 that exits the motion allowed area by causing the model of the robot 1 to perform a simulated motion in which the control point (for example, a tool center point (TCP)) of the robot 1 moves toward a reference point.

The visualization unit 154 visualizes a portion of the robot 1 that has exited the motion allowed area or a portion of the robot 1 that has entered the motion prohibited area by displaying the portion on, for example, the display unit 53.

Note that in the storage device 55, various types of three-dimensional geometry data, such as a robot model and a shape model enclosing the robot, used in the motion simulation and weight data of various types of objects, such as arms and a work tool, are stored.

FIG. 4 is a basic flowchart illustrating processing (hereinafter, also referred to as visualization processing) to visualize a portion of the robot 1 that has exited the motion allowed area (a portion of the robot 1 that has entered the motion prohibited area), the processing being executed in the simulation device 50. The visualization processing in FIG. 4 is executed under the control of a processor 51 of the simulation device 50.

Figure 6:
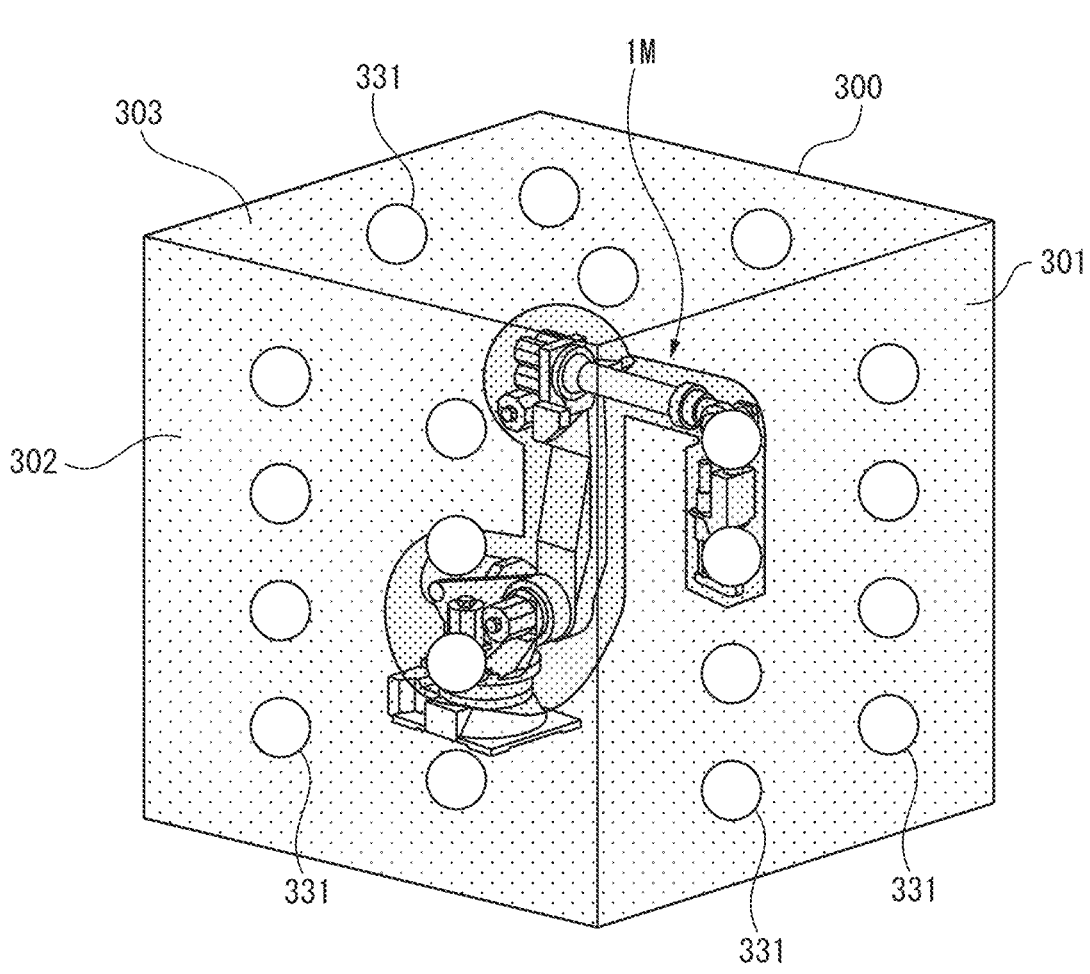
FIG. 6 is a diagram illustrating an example in which the motion allowed area is assumed to be a rectangular parallelepiped and lattice points serving as reference points are set on an outer surface of the motion allowed area.
Figure 7:
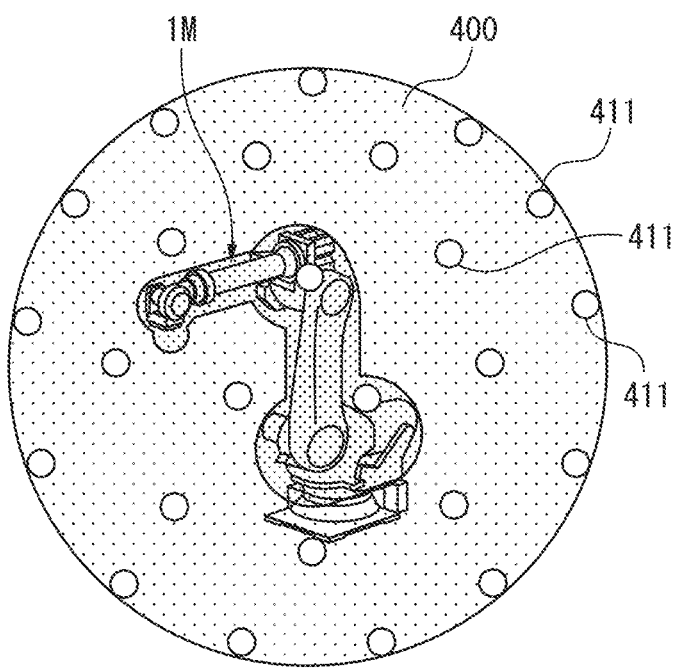
FIG. 7 is a diagram illustrating an example in which the motion allowed area is assumed to be a spherical shape and reference points are set on an outer surface of the motion allowed area.

The user first generates a motion program by performing various types of teaching on the robot 1 (step S1). Next, under the assistance of the function of the area setting unit 151, a motion allowed area or a motion prohibited area is set (step S2). As an example, a rectangular parallelepiped motion allowed area 300 as illustrated in, for example, FIG. 6, or a spherical motion allowed area 400 as illustrated in, for example, FIG. 7 is set herein.

Next, the simulation device 50 (the estimation unit 153) estimates a motion of the robot 1 when the robot 1 is controlled to stop since the robot 1 exits the motion allowed area (when the robot 1 is controlled to stop since the robot 1 enters the motion prohibited area) (step S3).

Next, the simulation device 50 (the visualization unit 154) visualizes a portion of the robot 1 that has exited the motion allowed area (or a portion of the robot 1 that has entered the motion prohibited area) (step S4).

A method when a motion in which the robot 1 exits the motion allowed area (or a motion in which the robot 1 enters the motion prohibited area) that is executed in the above-described step S3 is simulated will be described below. As elements for establishing the basis of the simulation in this case, elements described in the following (A1) to (A4) can be considered. Taking into consideration and selecting such elements and setting up simulation enable a simulation having various characteristics to be performed. Although for the convenience of description, a case where the robot moves out of the motion allowed area will be described below, the elements described below can likewise be applied to a motion when the robot enters the motion prohibited area.

(A1) Arrangement of reference points (A2) Posture of a work tool (A3) Type of motion of the robot (A4) Speed and direction toward a reference point (A5) Type of stop control of the robot after deviation detection The elements (A1) to (A5) will be described below.

(A1) Arrangement of Reference Points

Reference points are positions that are used as references when the robot 1 is caused to perform a motion to exit the motion allowed area, and points set on a boundary surface of the motion allowed area (motion prohibited area) are a representative example of the reference points. The reference points may be set as lattice points that are arranged at predetermined intervals on each plane serving as an outer surface of the motion allowed area when the motion allowed area is formed as a rectangular parallelepiped as illustrated in FIG. 6. In FIG. 6, a state in which a plurality of reference points 331 are set as lattice points on outer surfaces (three planes 301 to 303) of the motion allowed area 300 formed in a rectangular parallelepiped is illustrated. Alternatively, when the motion allowed area is a spherical shape as illustrated in FIG. 7, the reference points may be set as points that are uniformly distributed on the spherical outer surface (boundary surface). In FIG. 7, an example in which a plurality of reference points 411 are set in such a manner as to be uniformly distributed on the outer surface of the motion allowed area 400 formed in a spherical shape is illustrated.

(A2) Posture of a Work Tool

A shape and trajectory of a portion of a robot that has exited a motion allowed area change depending on a posture of a work tool when the portion exits the motion allowed area (in other words, when the portion moves toward a reference point). Therefore, when the robot 1 is caused to perform some motion and a deviation portion is visualized, performing simulations with respect to a plurality of postures of the work tool can make a simulation result more effective. For example, when a motion in which the TCP of the robot is caused to linearly move toward a reference point is performed, a simulation may be performed with respect to a plurality of tool postures in each of which one of the ±directions of the X-axis, the ±directions of the Y-axis, and the ±directions of the Z-axis of a tool coordinate system that is set on the work tool coincides with a motion direction of the robot 1. In addition to the above-described postures, tool postures achieved by rotating the work tool about one or more axes among the X-axis, the Y-axis, and the Z-axis may be added.

(A3) Type of Motion Command of the Robot

Motion commands of the robot include a linear motion in which the control point (TCP) of the robot is linearly moved to a target position and a joint motion in which the control point is caused to reach the target position by causing each axis to move. The linear motion can be suitably used when a simulation in which the control point (TCP) of the robot is moved toward a reference point at a predetermined speed in a predetermined direction is performed. The joint motion can be suitably employed when, for example, a simulation in which each of the axes is caused to move at a maximum speed of the axis from a reference point is performed.

(A4) Speed and Direction Toward a Reference Point

A shape and trajectory of a portion of the robot 1 that has exited the motion allowed area may change depending on speed and direction of the robot 1 moving toward a reference point. For example, a case where the motion allowed area is a rectangular parallelepiped is assumed. When the control point (TCP) of the robot 1 is moved toward a lattice point in a linear motion, it is considered that setting a movement direction of the TCP to be perpendicular to a plane serving as an outer surface of the motion allowed area on which the lattice point exists and motion speed of the TCP to be maximum is effective to maximize a deviation portion. However, it is considered that at a portion close to a corner of the motion allowed area, inclining the movement direction of the TCP with respect to an outer surface (a plane) (for example, bringing the movement direction of the TCP close to a direction pointing from the geometric center of the motion allowed area toward the corner portion) is effective to maximize a deviation portion. Note that the matters described above also apply to a case where an entry portion into an entry prohibited area is calculated. The estimation unit 153 may take into consideration the matters described above when calculating a deviation portion (entry portion). Note that speed and angle of the robot 1 moving toward a lattice point may be set to arbitrary values taking into consideration, for example, properties of the work space.

(A5) Type of Stop Control

As a motion when after a deviation of the robot 1 from the motion allowed area (an entry into the motion prohibited area) is detected, the robot 1 is controlled to stop, not only a motion when coasting due to emergency stop is assumed but also a motion when the robot 1 is controlled to stop under predetermined deceleration control is conceivable. When a movement of coasting due to an emergency stop is calculated, how far each axis of the robot 1 coasts when the robot 1 makes an emergency stop is calculated in advance. When predetermined deceleration control is performed when the robot 1 exits the motion allowed area (or when the robot 1 enters the motion prohibited area), a motion when the robot 1 exits the motion allowed area (or when the robot 1 enters the motion prohibited area) can be calculated from a deceleration control pattern of the deceleration control. Note that as the predetermined deceleration control, control in which a trajectory to cause the robot 1 to smoothly stop is planned and the robot 1 is caused to move along the planned trajectory is conceivable.

A specific example of estimation processing performed by the estimation unit 153 in the above-described step S3 will be described below. FIG. 5 is a flowchart illustrating a specific example of the estimation processing performed by the estimation unit 153 in step S3. In this example, it is assumed that the motion allowed area is formed in a rectangular parallelepiped and reference points are set as lattice points on each plane serving as an outer surface of the motion allowed area.

In step S31, the simulation device 50 (the reference point setting unit 152) sets lattice points serving as reference points when a portion of the robot 1 that exits the motion allowed area or a portion of the robot 1 that enters the motion prohibited area is calculated on surfaces (outer surface) that enclose the motion allowed area or the motion prohibited area. For example, the simulation device 50 (the reference point setting unit 152) may accept an operation input specifying an interval between lattice points from the user and set lattice points at specified intervals on the surfaces enclosing the motion allowed area or the motion prohibited area.

In this example, it is assumed that a rectangular parallelepiped motion allowed area 300 as illustrated in FIG. 6 is set. It is also assumed that reference points (lattice points) 331 are set at the specified intervals on six planes (three planes 301 to 303 are illustrated in FIG. 6) that constitute the outer surface of the motion allowed area 300.

In step S32, the simulation device 50 (the estimation unit 153) sets a posture of the work tool when the robot 1 moves toward a lattice point. The estimation unit 153 calculates a motion after the robot 1 has exited the motion allowed area from the lattice point until the robot 1 comes to a stop (or a motion after the robot 1 has entered the motion prohibited area from the lattice point until the robot 1 comes to a stop) (step S33).

The estimation unit 153 repeatedly executes motions in steps S32 and S33 with respect to all the lattice points (a loop process in step S34) and also repeatedly executes the motions with respect to various tool postures (a loop process in step S35).

A specific motion example in steps S32 to S35 will be described. In a motion example described below, it is considered that when the robot 1 projects out of the motion allowed area 300 in the surface-perpendicular direction to the outer surface of the motion allowed area 300 at a maximum speed, coasting distance becomes large. Therefore, in this case, the robot 1 is caused to move at the maximum speed in a linear motion in such a way that the TCP moves toward a lattice point in the surface-perpendicular direction to a surface (the outer surface of the motion allowed area) on which the lattice point is located, each stop position when the robot 1 projects out of the motion allowed area is estimated, and a portion that protrudes out of the motion allowed area is visualized. As a stopping motion, a case where after deviation of the robot 1 (robot 1M) from the motion allowed area is detected, an emergency stopping motion is performed and the robot 1 coasts and comes to a stop is assumed. As for a tool posture, motions in three postures in each of which one of the −X-axis direction, the +Y-axis direction, and the +Z-axis direction of the tool coordinate system coincides with a direction in which the TCP moves to a lattice point are assumed.

Figures 8, 9:
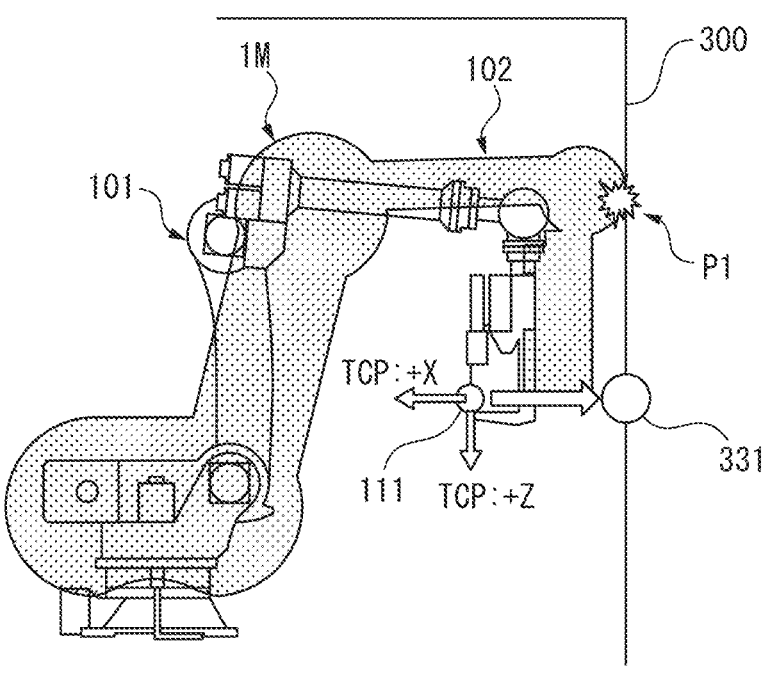
FIG. 8 is a diagram illustrating a state in which the robot is caused to perform a linear motion toward a reference point.
FIG. 9 is a diagram illustrating an example of a table representing a relationship between speed immediately before starting coasting and weight of a tool and the amount of coasting of an axis.

As illustrated in FIG. 8, the −X-axis direction of the tool coordinate system that is set on the work tool 17 is caused to coincide with a movement direction of the TCP (the origin of the tool coordinate system) of the robot 1. The robot 1 that is in a state of a posture 101 described above is caused to perform a linear motion toward a reference point (lattice point) 331 in a direction perpendicular to a surface of the motion allowed area 300, i.e. the −X-axis direction, at the maximum speed of the robot 1 (TCP). A posture 102 is a posture at the moment when the robot 1 (robot 1M) comes out of the motion allowed area 300. In this example, it is assumed that the robot 1 (robot 1M) projects out of the motion allowed area 300 at a position P1 in a vicinity of the arm tip portion. A posture (angle) of each axis at the moment is calculated. In addition, a posture of each axis at a position at which the robot 1 (robot 1M) is moved to the near side (in this case, in the +X-direction of the TCP) by a minute distance from the posture 102 is calculated. Difference values calculated by subtracting the latter postures of the axes from the former postures of the axes become a ratio of motion speeds of the axes of the robot 1 at the moment when the robot comes out of the motion allowed area 300 in a linear motion. As an example, it is assumed that the robot 1 is a six-axis robot and a ratio of motion speeds that is calculated in this example is represented by $$m1:m2:m3:m4:m5:m6$$

with respect to the axes J1 to J6.

From the value of the ratio and maximum motion speeds of the axes of the robot 1, motion speeds of the axes of the robot 1 at the moment when the robot 1 performs a linear motion at the maximum speed that the robot 1 can achieve and comes out of the motion allowed area 300 can be calculated. In other words, when the value of the ratio of motion speeds of the axes is multiplied by n, it is only required to calculate a value of n that causes a value of motion speed with respect to one of the axes to be a maximum motion speed of the axis and values of motion speeds of the other axes to be a speed less than or equal to maximum motion speeds. When in the case where the above-described values m1 to m6 of the ratio is multiplied by n, a value (n×m6) of the axis J6 is the maximum speed of the axis J6 and each of values (n×m1), (n×m2), (n×m3), (n×m4), and (n×m5) of the other axes is less than or equal to the maximum speed of the axis, the speeds are motion speeds of the axes at the moment when the robot 1, while performing linear motion at the maximum speed that the robot 1 can achieve, comes out of the motion allowed area.

When the motion speeds of the axes are calculated, a position at which the robot 1 coasts from the position at the moment when the robot 1 comes out of the motion allowed area and comes to a stop can be calculated. It can be considered that the amount of coasting of each axis of the robot 1 has a relationship with speed immediately before starting coasting and weight of the work tool 17 with respect to each axis. The relationship between the amount of coasting of each axis and the speed immediately before starting coasting and the weight of the tool is acquired in advance by experiment or the like. The simulation device 50 stores information representing the relationship between the amount of coasting of each axis and the speed immediately before starting coasting and the weight of the work tool 17 in, for example, the storage device 55 in advance.

In FIG. 9, a table representing, with respect to a drive axis, the amount of coasting (the amount of change) of the drive axis when the emergency stop of the robot 1 is performed is illustrated. The table illustrates, with respect to a drive axis, the amount of change of the drive axis when the emergency stop of the robot 1 is performed during a period in which the robot 1 is driven in a predetermined direction at a predetermined motion speed. The amount of change of a drive axis is equivalent to a rotation angle after the emergency stop is performed until the robot 1 comes to a complete stop.

The amount of change of a drive axis is represented by a function of the motion speed of the drive axis immediately before the emergency stop and the weight of the work tool. The heavier the work tool becomes, the larger the amount of change of a drive axis after an emergency stop is performed. The larger the motion speed of the drive axis when an emergency stop is performed, the larger the amount of change of the drive axis. The amount of change of a drive axis illustrated in FIG. 9 may be acquired in advance by actually driving the robot 1. The simulation device 50 retains a table as illustrated in FIG. 9 with respect to each drive axis.

For example, it is assumed that the speed at the time of starting coasting and weight of the work tool with respect to the axis having a relationship illustrated in the table in FIG. 9 are 20 deg/s and 30 kg, respectively. In this case, the estimation unit 153 of the simulation device 50 acquires information indicating that the amount of coasting (angle) of the axis is 8 deg from the table. The estimation unit 153 acquires the amount of coasting with respect to each axis from speed of the axis at the time of starting coasting that is acquired by the above-described method, based on relationships as illustrated in FIG. 9 that are stored in advance with respect to each axis. Through this processing, the estimation unit 153 is capable of acquiring a motion of the robot 1 until the robot 1 coasts and comes to a stop due to emergency stop.

Figure 10:
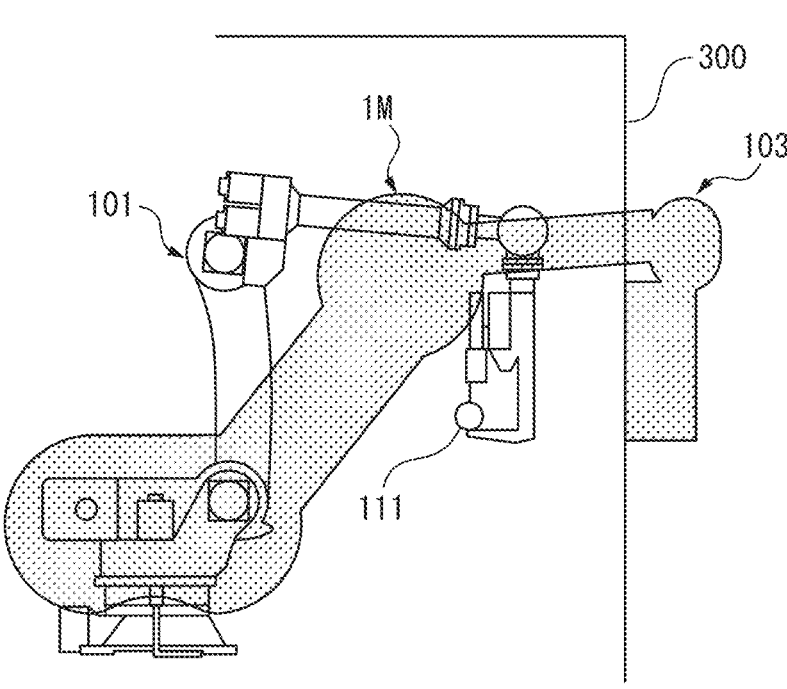
FIG. 10 is a diagram illustrating an example in which a state in which after the motion illustrated in FIG. 8, the robot has exited the motion allowed area and has stopped is visualized.

In FIG. 10, an example in which a state in which the robot 1 has exited the motion allowed area 300 and has stopped, the state being reached by performing the motion described above, is visualized is illustrated. In this example, a state in which the work tool 17 and the arm tip portion (simplified shapes enclosing the work tool 17 and the arm tip portion) of the robot 1 deviate from the outer surface of the motion allowed area 300 is visualized as a posture 103. Note that although in this example, an example in which a state in which the robot 1 has stopped is visualized is described, it may be configured to visualize a state of the robot 1 including motion of the robot 1 until the robot 1 comes to a stop.

The simulation device 50 performs visualization of a deviation portion of the robot 1 from the motion allowed area 300 (or an entry portion into the motion prohibited area), which is described above, with respect to all the lattice points.

Figure 11A:
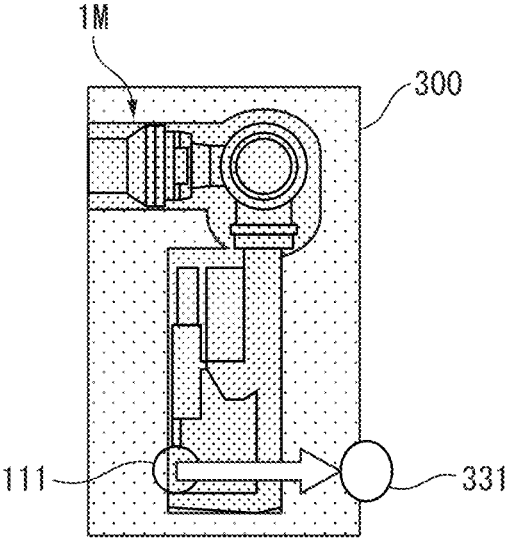
FIG. 11A is a diagram illustrating a state in which the robot moves toward a reference point while a tool is in a posture in which a direction of the −X-axis of a tool coordinate system coincides with a movement direction of the robot.
Figure 11B:
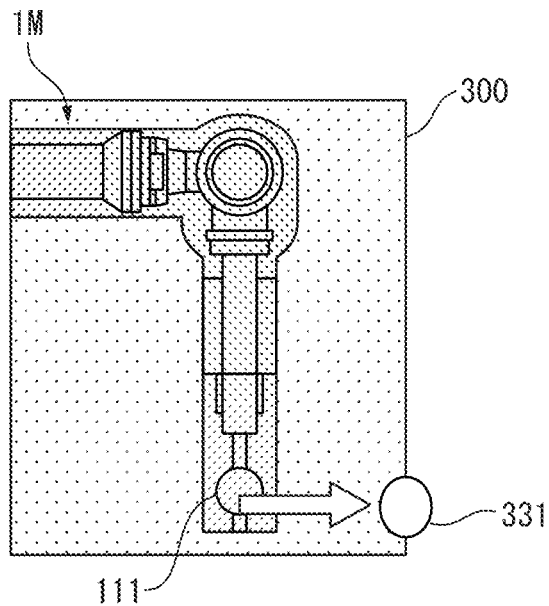
FIG. 11B is a diagram illustrating a state in which the robot moves toward the reference point while the tool is in a posture in which a direction of the +Y-axis of the tool coordinate system coincides with the movement direction of the robot.
Figure 11C:
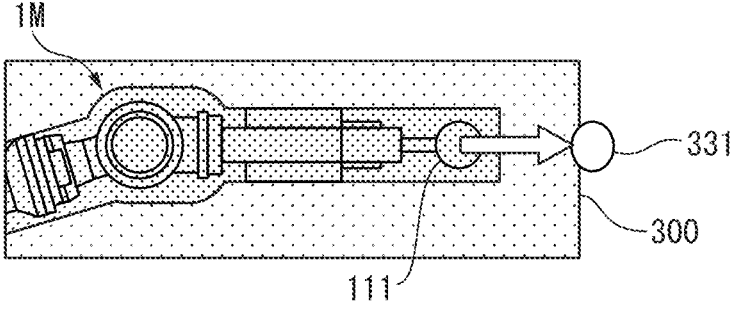
FIG. 11C is a diagram illustrating a state in which the robot moves toward the reference point while the tool is in a posture in which a direction of the +Z-axis of the tool coordinate system coincides with the movement direction of the robot.

The estimation unit 153 also performs visualization of a deviation portion of the robot 1 from the motion allowed area 300 (or an entry portion into the motion prohibited area) with respect to all the tool postures. In the present example, the estimation unit 153 calculates a position and posture of a deviation portion (or an entry portion) of the robot 1 when the robot 1 exits the motion allowed area (or when the robot 1 enters the motion prohibited area) at a lattice point, with respect to three motions including the posture of the tool:

a motion in which the robot 1 (TCP 111) moves toward a reference point (lattice point) 331 while the tool is in a posture in which the direction of the −X-axis of the tool coordinate system coincides with a movement direction of the robot 1 (TCP 111) (FIG. 11A);

a motion in which the robot 1 (TCP 111) moves toward the reference point (lattice point) 331 while the tool is in a posture in which the direction of the +Y-axis of the tool coordinate system coincides with the movement direction of the robot 1 (TCP 111) (FIG. 11B); and a motion in which the robot 1 (TCP 111) moves toward the reference point (lattice point) 331 while the tool is in a posture in which the direction of the +Z-axis of the tool coordinate system coincides with the movement direction of the robot 1 (TCP 111) (FIG. 11C).

When it is assumed that the robot projects out of the motion allowed area from an arbitrary position in the motion allowed area while the tool is in an arbitrary posture and is controlled to emergently stop, the processing described above enables a range where the robot may project out of the motion allowed area to be estimated and visualized. Likewise, a range where the robot may enter the motion prohibited area can be estimated and visualized.

Figure 12:
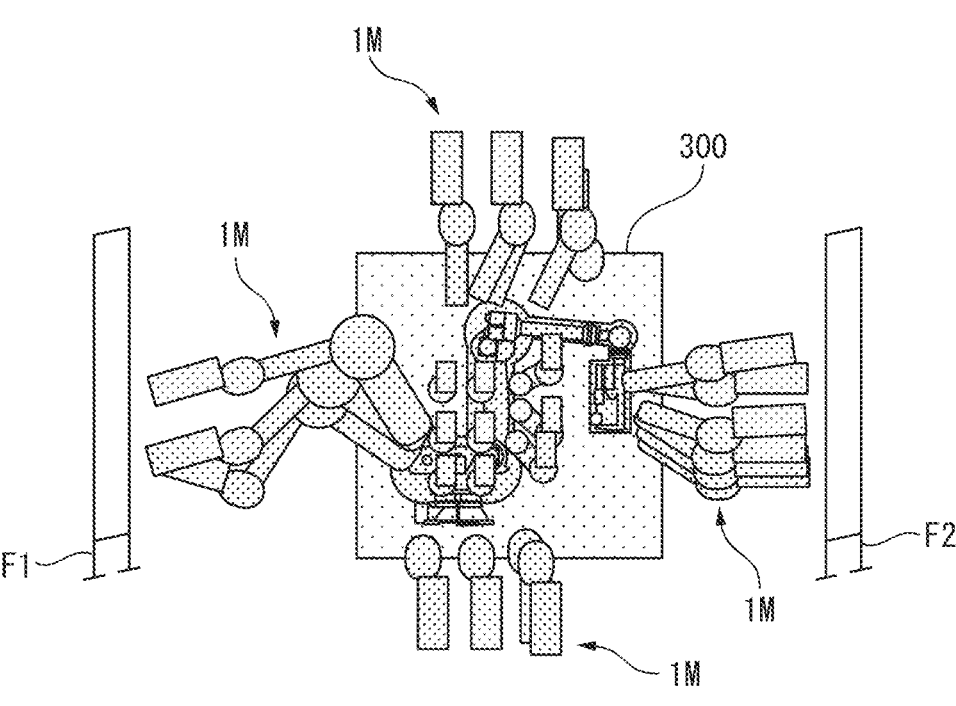
FIG. 12 is a diagram illustrating a state in which various postures when the robot has exited the motion allowed area are visualized.

In FIG. 12, an example in which all the postures of the robot 1 (robot 1M) that has exited the motion allowed area 300 by the simulated motion described with reference to the above-described steps S31 to S35 are visualized is illustrated. A simulation result as illustrated in FIG. 12 is displayed on, for example, the display unit 53. The user is able to determine an arrangement of safety fences F1 and F2 in, as an example, an arrangement relationship as illustrated in FIG. 12, based on the simulation result.

Figure 13:
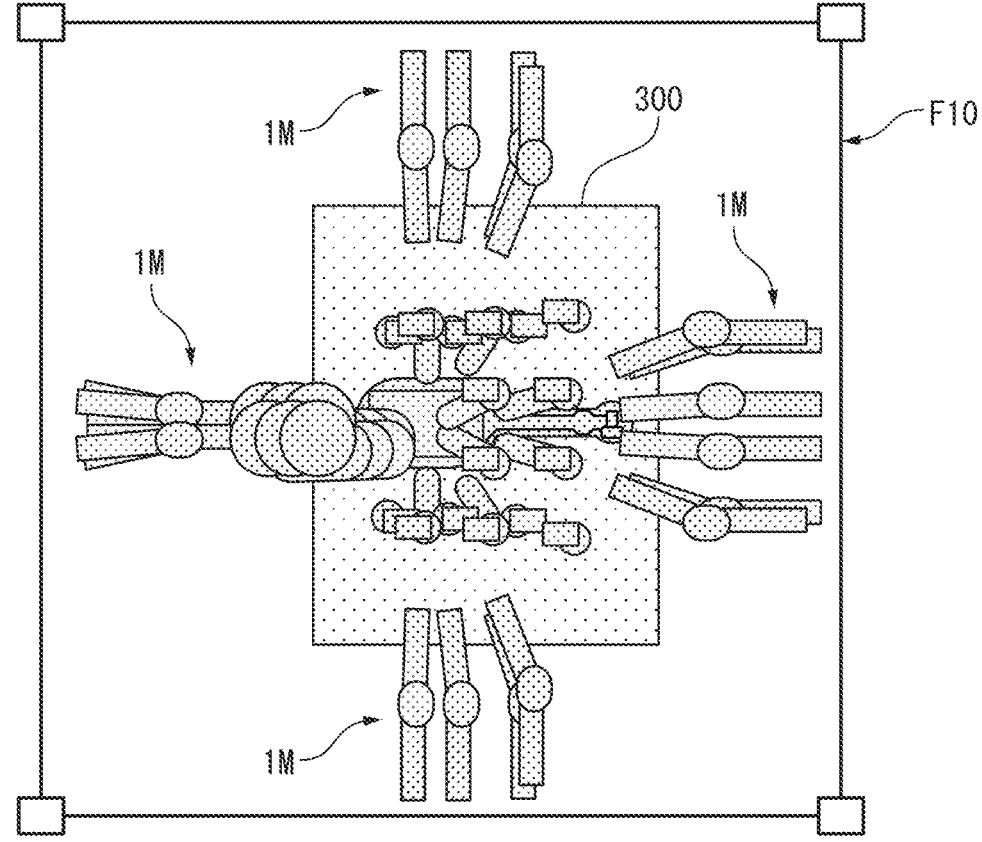
FIG. 13 is a diagram illustrating a state in which an installation example of a fence is visualized in conjunction with various postures when the robot has exited the motion allowed area.

Alternatively, the estimation unit 153 may be configured to, when a state as illustrated in FIG. 13 is calculated as a simulation result when the robot 1 (robot 1M) exits the motion allowed area 300, calculate an arrangement of a safety fence F10, based on the simulation result. An arrangement of a safety fence that is calculated by the estimation unit 153 may be visualized by the visualization unit 154. As an example, a position of the safety fence F10 may be determined in such a way that the position has a predetermined margin to the maximum amount of projection of the robot 1 (robot 1M) from each surface of the motion allowed area 300.

Although in the simulated motion example that is described above with reference to steps S31 to S35 in FIG. 5, an example of a case where the robot 1 is caused to perform a linear motion is described, an example in which the robot 1 is caused to perform a joint motion and a motion in which the robot 1 exits the motion allowed area is calculated is also conceivable, as described above. When the joint motion is employed, a motion like the following motion (B1) or (B2) may be employed.

(B1) The robot 1 is caused to perform the joint motion in such a way that the robot 1 passes a reference point or to perform the joint motion with the reference point as a motion starting point. When a deviation of the robot 1 from the motion allowed area is detected, the robot 1 is controlled to perform an emergency stop. The amount of motion of each axis after the emergency stop may be calculated using a table as illustrated in FIG. 9 under the assumption that each axis was moving at the maximum speed of the axis at the moment when the robot 1 is controlled to perform the emergency stop. Alternatively, as a behavior of the robot 1 in a vicinity of a position at which the robot 1 exits the motion allowed area, speeds of the axes at the moment when the robot 1 exits the motion allowed area and speeds of the axes at a position at which the robot 1 is moved to the near side from the deviation position may be calculated, and when the speeds of the axes change in an increasing direction, the amount of coasting may be calculated in the same manner as described above under the assumption that the axes of the robot move at the maximum speeds of the axes at the moment when the robot exits the motion allowed area.

(B2) The robot is caused to perform a behavior in which the robot largely moves a specific axis from a reference point, and a position and posture of a portion of the robot that exits the motion allowed area are calculated. For example, an example in which the robot is caused to perform a behavior in which the robot swings only the axis J1 within a motion allowable range or an example in which the robot is caused to perform a behavior in which the robot swings only the axes J2 and J3 within motion allowable ranges of the axes J2 and J3, respectively is conceivable.

Figure 14:
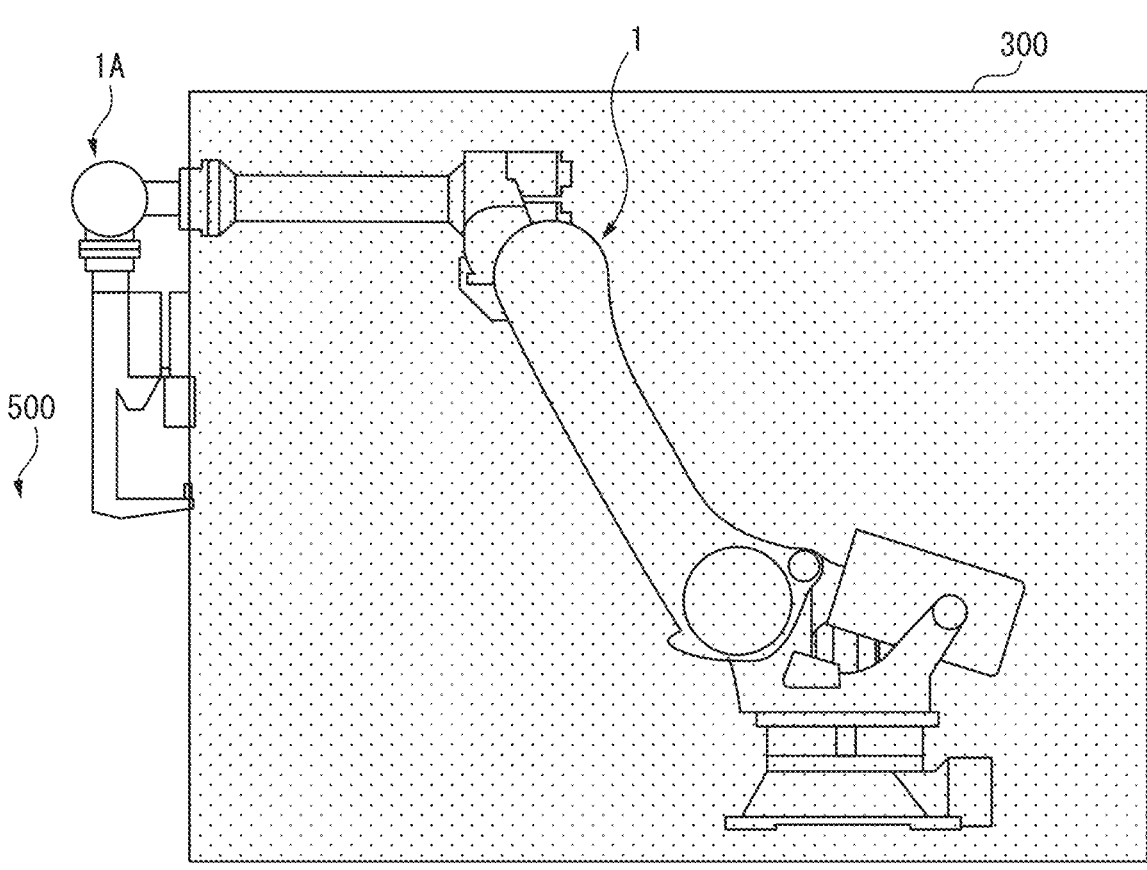
FIG. 14 is an example in which a state in which the robot has exited the motion allowed area (or a state in which the robot has entered a motion-prohibited area) is visualized and illustrates a state in which the robot is viewed from a lateral side.
Figure 15:
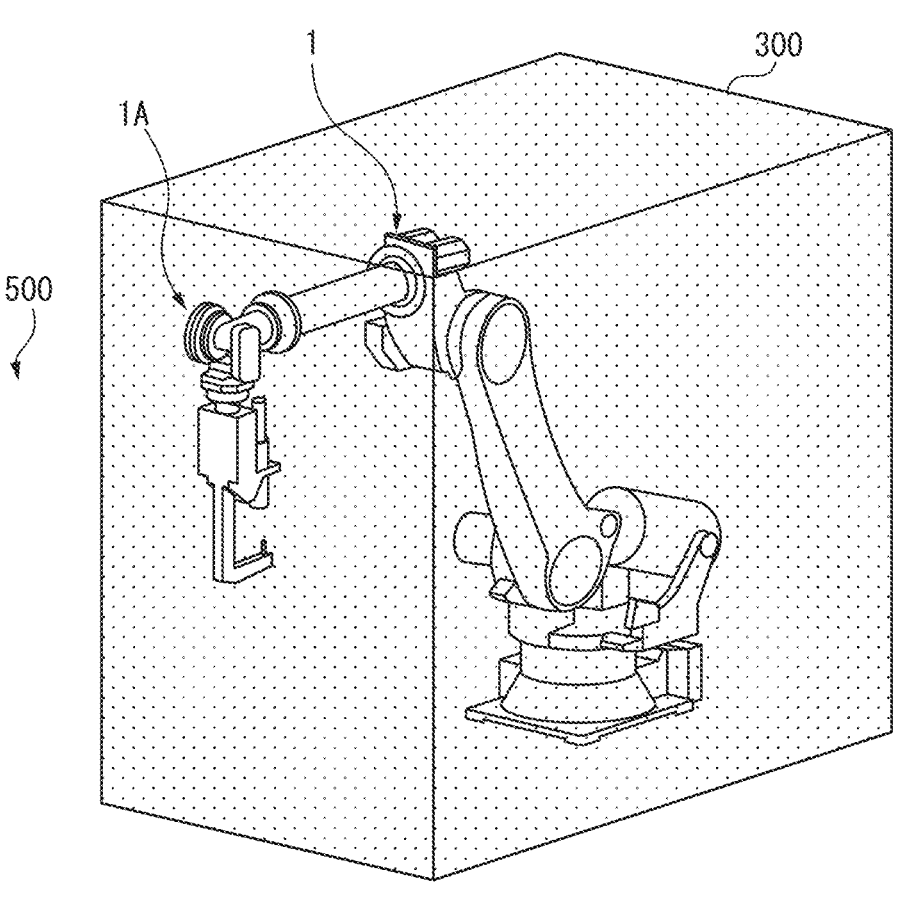
FIG. 15 is an example in which a state in which the robot has exited the motion allowed area (or a state in which the robot has entered the motion prohibited area) is visualized and illustrates a state in which the robot is viewed from an obliquely upper side.

In FIGS. 14 and 15, an example in which a state in which the robot 1M has exited the motion allowed area and has come to a stop is visualized by the above-described visualization processing is illustrated. Note that FIG. 14 illustrates an example of the visualization when the robot 1M is viewed from a lateral side, and FIG. 15 is the example of the visualization when the robot 1 is viewed from an obliquely upper side. In this example, shapes enclosing the robot 1 are omitted. In the present example, an arm tip portion 1A of the robot 1 has exited the motion allowed area. Note that when a space 500 excluding the motion allowed area 300 is defined as a motion prohibited area, FIGS. 14 and 15 illustrate a state in which the robot 1 (robot 1M) has entered the motion prohibited area (the space 500).

Figure 16:
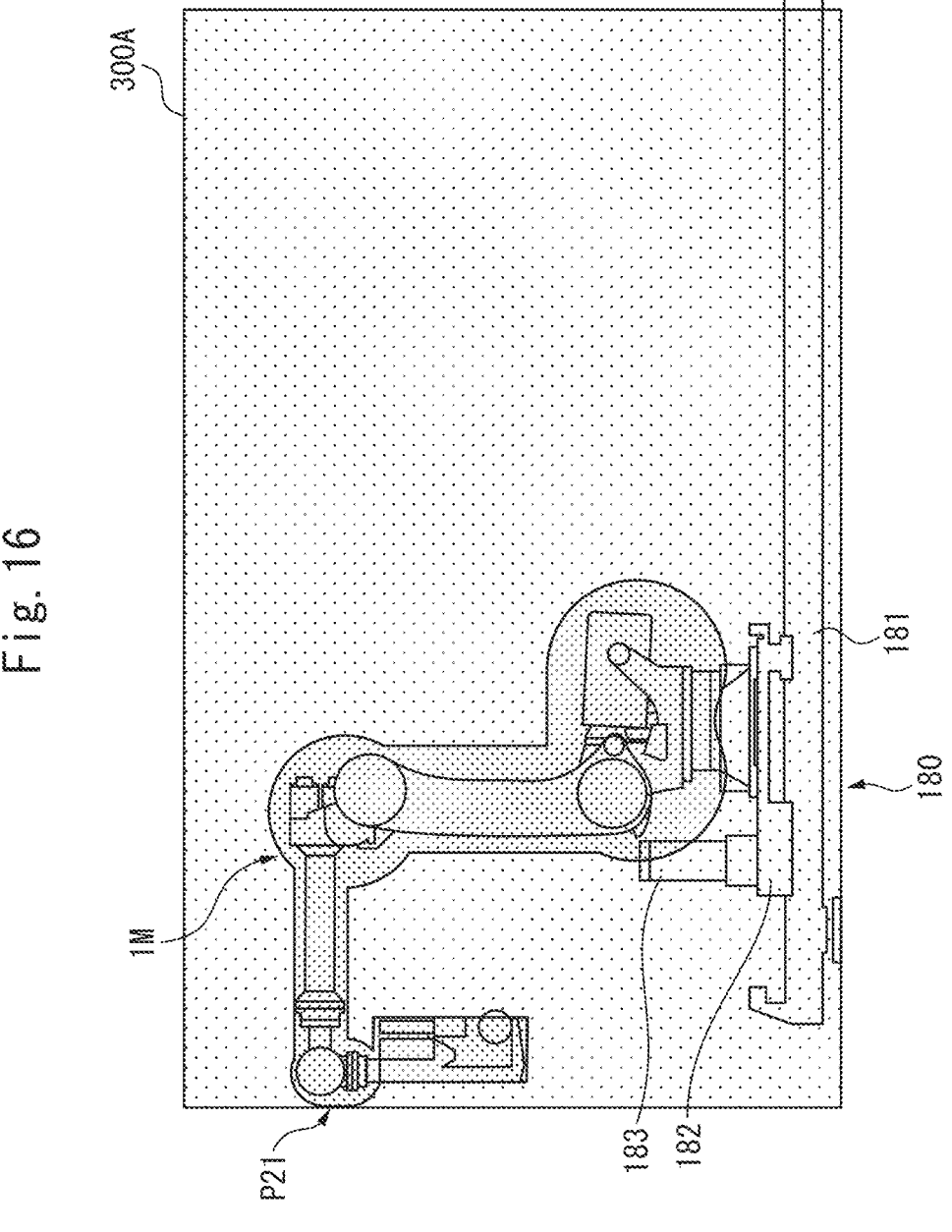
FIG. 16 is a diagram for a description of a state in which the robot mounted on a traveling platform exits the motion allowed area.
Figure 17:
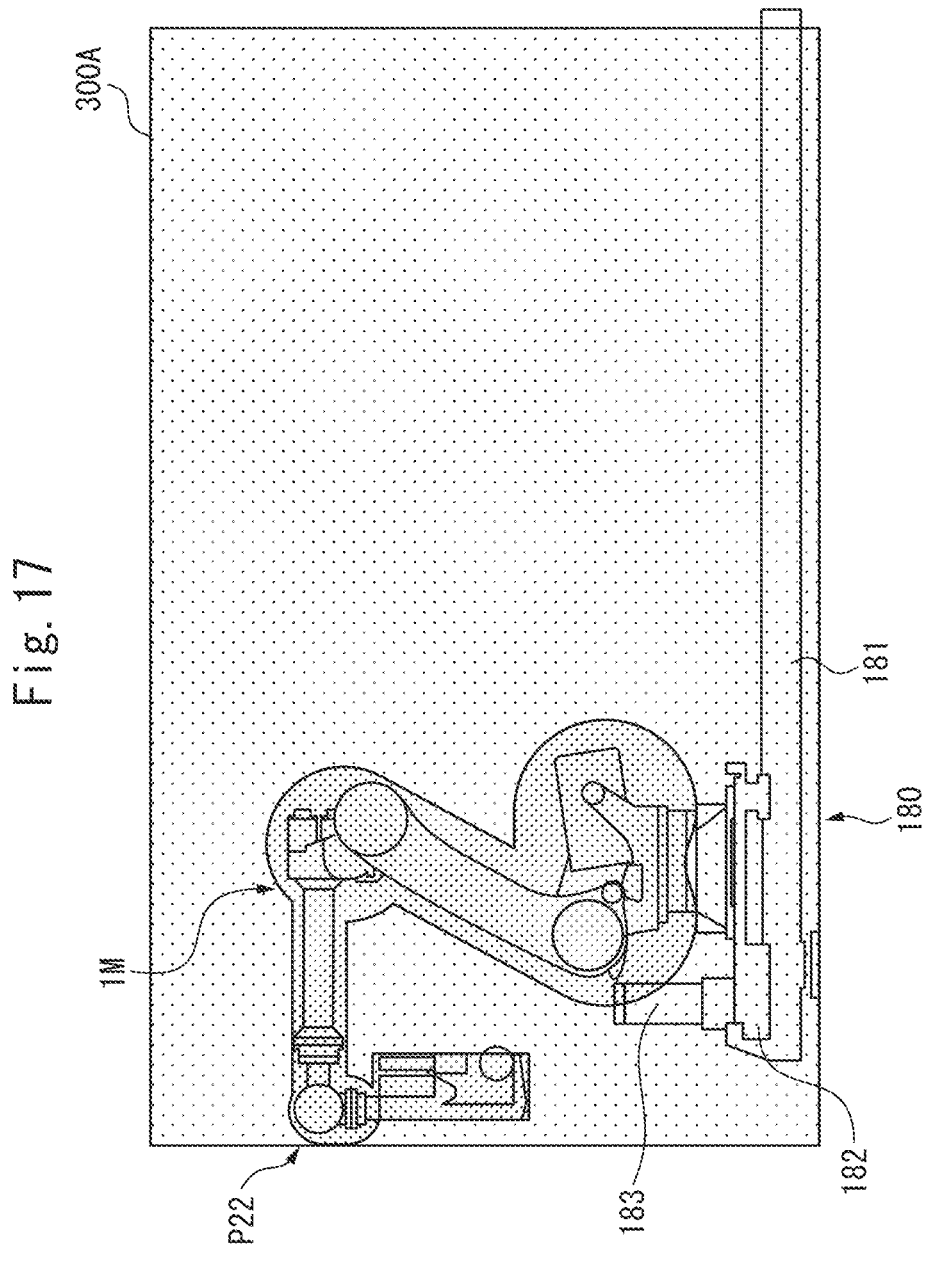
FIG. 17 is a diagram for a description of a state in which the robot mounted on the traveling platform exits the motion allowed area and a posture of the robot is different from a posture illustrated in FIG. 16.

Apart from a case where the robot 1 is fixed to the mounting surface 20 as illustrated in FIG. 1, the robot 1 is sometimes mounted on a traveling platform. With reference to FIGS. 16 and 17, visualization processing of a deviation portion from a motion allowed area when the robot 1 is mounted on a traveling platform in a movable manner will be described. As illustrated in FIG. 16, a mobile mechanism 180 includes a rail 181, a traveling platform 182 that is mounted on the rail 181 in a movable manner, and a motor 183 to drive the traveling platform 182. The robot 1 (robot 1M) is mounted on the traveling platform 182.

In FIG. 16, a motion allowed area 300A that is set when the robot 1 is configured in the above-described manner is also illustrated. In this example, the robot 1 (robot 1M) is caused to move toward a reference point that is set on a surface on the left-hand side in the drawing (hereinafter, referred to as a front surface) of the motion allowed area 300A in a motion described as an example in steps S31 to S35, and the traveling platform 182 is also caused to move in the leftward direction (the front) in the drawing. In the above-described motion, a deviation of the arm tip portion of the robot 1 from the motion allowed area 300 is detected at a position P21. Under the assumption that from this moment, the robot 1 and the traveling platform 182 are caused to perform an emergency stop, a motion of a portion of the robot 1 that exits the motion allowed area 300 due to coasting is calculated.

As for the amount of coasting of the robot 1, the amount of coasting of each axis can be calculated by a calculation method using a table as illustrated in FIG. 8, as described above. As for the traveling platform 182, a coasting distance in this case can be calculated by calculating a relationship between load weight and coasting distance as, for example, numerical data (table) in advance. By adding the coasting distance of the traveling platform 182 to the amount of coasting of the robot 1, a motion of a portion exiting the motion allowed area 300 is calculated.

FIG. 17 illustrates an example of a case where the robot 1 mounted on the traveling platform 182 projects out of the motion allowed area 300A at a position P22. In this case, since the position of the traveling platform 182 when the robot 1 projects out of the motion allowed area 300 is different from the position of the traveling platform 182 in the case of FIG. 16, a posture of the robot 1 when the robot 1 projects out of the motion allowed area 300A is a different posture from the posture in the case illustrated in FIG. 16.

Note that although a motion when the robot exits the motion allowed area is described in this example, the above description can likewise be applied to a case where a portion of the robot that enters the motion prohibited area is calculated.

As described above, in a configuration example in which the robot 1 is mounted on a traveling platform, it is also possible to calculate and visualize a portion of the robot that exits the motion allowed area (or a portion of the robot that enters the motion prohibited area).

As described in the foregoing, according to the present embodiment, it becomes possible to visualize a portion of the robot that has exited the motion allowed area or a portion of the robot that has entered the motion prohibited area and install a fence at an appropriate position.

Although the present invention was described above using a typical embodiment, a person skilled in the art would understand that changes and other various modifications, omissions, and additions can be made to the embodiment described above without departing from the scope of the present invention.

Various types of functions to calculate and visualize a motion of the robot exiting the motion allowed area in the above-described embodiment can also likewise be applied to a case where a motion of the robot entering the motion prohibited area is calculated and visualized.

For example, it is not that in the functional block diagram illustrated in FIG. 3, all the elements are essential. For example, it may be configured to display an image calculated by the visualization processing on a display unit of an external device of the simulation device 50. It may be configured such that the simulation device 50 acquires three-dimensional geometry data, weight data, the table illustrated in FIG. 9, and the like from an external device.

The functional blocks of the simulation device illustrated in FIG. 3 may be achieved by a processor of the simulation device executing various types of software stored in the storage device or may be achieved by a configuration in which hardware, such as an application specific integrated circuit (ASIC), is mainly used.

Programs that execute various types of processing, such as the visualization processing, in the above-described embodiment can be recorded in various types of computer-readable recording media (for example, a semiconductor memory, such as a ROM, an EEPROM, and a flash memory, a magnetic recording medium, and an optical disk, such as a CD-ROM and a DVD-ROM).

REFERENCE SIGNS LIST 1, 1M Robot
11 Turning unit
12a, 12b Arm
13 Joint unit
14 Motor
16 Wrist unit 17 Work tool
19 Base unit
20 Mounting surface
50 Simulation device
51 Processor
52 Memory
53 Display unit
54 Operation unit
55 Storage device
56 Input/output interface
111 TCP
151 Area setting unit
152 Reference point setting unit
153 Estimation unit
154 Visualization unit
180 Mobile mechanism
181 Rail
182 Traveling platform
183 Motor
300, 400 Motion allowed area
331, 411 Reference point
F1, F2, F10 Safety fence

The invention claimed is:

1. A simulation device, comprising:
a display;
a storage in which three-dimensional model data of a robot and a work tool are stored; and
a processor configured to
set a motion allowed area for the robot;
estimate, using the three-dimensional model data of the robot and the work tool stored in the storage, a motion of the robot with respect to each of a plurality of postures of the work tool mounted on the robot when control to cause the robot to stop is applied to the robot caused by deviation of the robot from the motion allowed area; and
visualize, by displaying, on the display, a portion of the robot that has exited the motion allowed area, based on the motion of the robot estimated by the processor.

2. The simulation device according to claim 1, wherein the processor is further configured to set the motion allowed area, based on user input.

3. The simulation device according to claim 1, wherein the processor is further configured to set a reference point that is used as a target position, a via position, or a motion start position when the robot is moved in a simulative manner in estimating the motion of the robot.

4. The simulation device according to claim 3, wherein the processor is further configured to set the reference point, based on user input.

5. The simulation device according to claim 3, wherein the reference point is defined as a plurality of points distributed on an outer surface of the motion allowed area.

6. The simulation device according to claim 3, wherein the processor is configured to estimate the motion of the robot by causing the robot to move in a linear motion or a joint motion in the simulative manner.

7. The simulation device according to claim 3, wherein the processor is configured to cause a control point of the robot to move in a linear motion in a predetermined direction with respect to the reference point at a predetermined speed in the simulative manner.

8. The simulation device according to claim 1, wherein control causing the robot to stop is performed through either an emergency stop or stop by predetermined deceleration control.

9. The simulation device according to claim 8, wherein the control causing the robot to stop is performed through the emergency stop, and the processor is further configured to calculate a further motion of the robot after the robot has exited the motion allowed area until the robot stops, based on information representing a relationship between a motion speed of each axis at a moment of the robot exiting the motion allowed area and a weight of the work tool mounted on the robot and an amount of coasting of each axis.

10. The simulation device according to claim 1, wherein the processor is further configured to:

calculate an arrangement of a safety fence to be arranged outside the motion allowed area, based on an estimation result of motion of the robot, and visualize, by displaying, on the display, the safety fence, based on the arrangement of the safety fence calculated by the processor.

11. The simulation device according to claim 1, wherein the processor is further configured to estimate, with respect to the robot mounted on a traveling platform, a motion of the robot and the traveling platform when control to cause the robot and the traveling platform to stop is applied to the robot and the traveling platform caused by deviation of the robot from the motion allowed area.

12. A simulation device, comprising:

a display;

a storage in which three-dimensional model data of a robot and a work tool are stored; and a processor configured to set a motion allowed area for the robot;

estimate, using the three-dimensional model data of the robot and the work tool stored in the storage, a motion of the robot with respect to each of a plurality of postures of a work tool mounted on the robot when control to cause the robot to stop is applied to the robot caused by deviation of the robot from the motion allowed area; and visualize, by displaying, on the display, a portion of the robot that has exited the motion allowed area, based on the motion of the robot estimated by the processor, wherein the processor is further configured to set a reference point that is used as a target position, a via position, or a motion start position when the robot is moved in a simulative manner in estimating the motion of the robot, the reference point is defined as a plurality of points distributed on an outer surface of the motion allowed area, and the processor is further configured to cause a control point of the robot to move toward the reference point in a linear motion in a direction perpendicular to an outer surface of the motion allowed area on which the reference point exists at a maximum speed of the robot in the simulative manner.

13. A simulation device, comprising:

a display;

a storage in which three-dimensional model data of a robot and a work tool are stored; and a processor configured to set a motion prohibited area for a robot;

estimate, using the three-dimensional model data of the robot and the work tool stored in the storage, a motion of the robot with respect to each of a plurality of postures of the work tool mounted on the robot when control to cause the robot to stop is applied to the robot caused by entry by the robot into the motion prohibited area; and visualize, by displaying, on the display, a portion of the robot that has entered the motion prohibited area, based on the motion of the robot estimated by the processor.

\* \* \* \* \*